United States Patent [19]

Dunn

[11] 4,085,427
[45] Apr. 18, 1978

[54] TRANSDUCER POSITIONING SYSTEM

[75] Inventor: David Dunn, Windham, N.H.

[73] Assignee: Data General Corporation, Southboro, Mass.

[21] Appl. No.: 750,287

[22] Filed: Dec. 13, 1976

[51] Int. Cl.$^2$ ............................................. G11B 21/10
[52] U.S. Cl. ..................................................... 360/77
[58] Field of Search .......................... 360/77; 307/351; 328/117, 116, 115, 150, 158, 159

[56] References Cited

U.S. PATENT DOCUMENTS

| 3,534,344 | 10/1970 | Santana | 360/77 |
| 3,893,180 | 7/1975 | Braun et al. | 360/77 |

Primary Examiner—Robert S. Tupper
Attorney, Agent, or Firm—Robert F. O'Connell

[57] ABSTRACT

A transducer positioning system wherein a pair of position information signals are first processed by means which tend to equalize the offset errors in each, the signals then being further processed by peak detection circuitry, the peak detection responses thereof being matched as by suitably matching appropriate transistor pairs therein so that offset errors arising with respect to each signal during the peak detection operations are made substantially equal. The peak detected signals are then suitably combined so that the substantially equalized offset errors are effectively eliminated and good temperature stability is maintained. Automatic gain control feedback circuitry using double-integration techniques is also utilized for assuring better position accuracy.

9 Claims, 8 Drawing Figures

TRANSDUCER POSITIONING SYSTEM

INTRODUCTION

This invention relates to the positioning of transducers with reference to a magnetic media and, more particularly, to the accurate positioning of a transducer with respect to the data tracks of a magnetic disk storage element.

BACKGROUND OF THE INVENTION

In positioning transducers, such as magnetic read/record heads, with reference to data tracks on one or more magnetic disks, data processing systems utilize techniques which detect position information which has been previously recorded on a selected magnetic disk or drum. Exemplary systems suggested by the prior art include that disclosed in U.S. Pat. No. 3,534,344, "Method and Apparatus for Recording and Detecting Information", issued to G. R. Santana on Oct. 13, 1970, and that disclosed in U.S. Pat. No. 3,893,180, "Transducer Positioning System", issued to W. A. Braun and D. S. Dunn on July 1, 1975.

The position information in such systems consists of separately identifiable magnetic recordings occurring on adjacent tracks of the magnetic disk surface. The position information is sent by a servo transducer which produces a servo signal containing responses to each identifiable recording. A transducer position is defined when the signal strength of each of the responses is exactly equal.

In a specific implementation of such a system, such as shown in the above-mentioned Braun and Dunn patent, the signal strengths of each response are evaluated by a novel detection system which first identifies the responses within the servo signal. The peak amplitudes of the responses are thereafter separately measured and separate signals are produced which are indicative of the measured peak amplitudes. These separate signals are thereafter combined so as to indicate whether the signal strength of either response dominates over the other.

In the previously used prior art systems, adjustment must be continuously made as by using appropriate potentiometer adjustment circuitry in order to assure that offset errors which are present in each of the signals and which subsequently arise in the peak detection process are appropriately taken into account. In order to do so, such systems must utilize highly accurate resistors in the peak detection circuitry thereof, which resistors must be hand selected in order to assure that they have desired matching values for reducing the peak detector offset errors as much as possible.

Apart from the expense of such hand selection, the requirement for continual adjustments in the field hampers the use thereof in many applications and it is desirable to provide a system in which the offset errors can be automatically eliminated without the need for the system operator to continually adjust the system operation for such purpose.

SUMMARY OF THE INVENTION

Applicant's invention provides a position detection system which utilizes peak detection techniques for providing accurate positioning and which at the same time eliminates offset errors which normally are present therein. In accordance therewith, applicant's system eliminates offset errors which may be present prior to the peak detection process by utilizing a pair of buffer amplifier circuits (a positive buffer dipulse circuit and a negative buffer dipulse circuit) responsive to the input dipulse position information, the outputs thereof being supplied to a feedback amplifier via low pass filters in a feedback circuit connected to the input of one of the buffer amplifier circuits. The use of such a feedback network causes the offsets generated in each of the positive and negative dipulse information signals to be made substantially equal, the equalized offsets being subsequently cancelled at a later stage of the system.

In order to eliminate offset errors which may arise in the peak detection processing circuitry of the system, the signals from each of the buffered position information channels are appropriately shifted in level at selected times, controlled by suitable gating, or clock, signals, the level shifted signals being supplied in each channel to both negative and positive peak detector circuits. The negative and positive peak detector circuits of one channel utilize transistors which are appropriately matched to those utilized in the negative and positive peak detector circuits, respectively, of the other channel. Accordingly, offset errors generated by the positive and negative peak detection process in each channel are made substantially equal. The outputs of the peak detector circuits are thereupon appropriately combined and amplified so that the equalized offset errors contained in each channel are effectively cancelled, the overall position error signal thereby containing substantially no offset error components therein.

The overall position error signal is thereupon supplied to a servo feedback amplifier via the automatic gain control circuitry of the system in substantially the same manner as found, for example, in the transducer positioning system described in the above-referenced Braun and Dunn patent so that the transducer head is maintained at the desired position relative to the position information data tracks.

The system of the invention provides for automatic elimination of offset errors without the need for any further potentiometer adjustments to be made in field operation of the system and without the need for hand selection of resistors during the manufacture thereof. Since matched transistor pairs are readily available in the art, the system of the invention is less costly than many prior art systems while at the same time providing reduced offset errors so that extremely accurate positioning of the transducer head results.

DESCRIPTION OF THE INVENTION

The invention can be described in more detail with the help of the accompanying drawings wherein.

Figure 1:
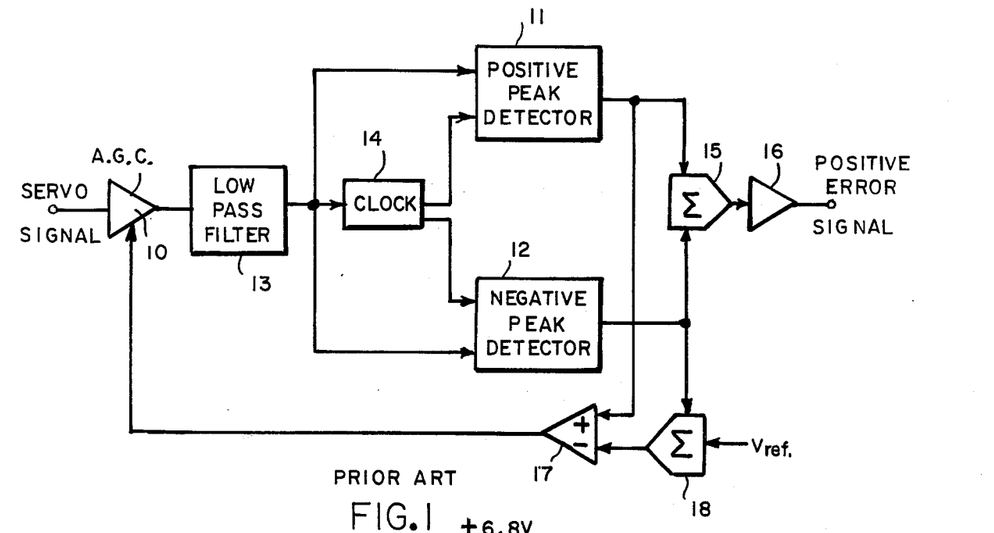
FIG. 1 shows a block diagram of an exemplary system used in the prior art.

As can be seen in FIG. 1, an exemplary prior art system described, for example, in the above-mentioned Braun and Dunn U.S. Pat. No. 3,893,180, provides an appropriate servo signal which is supplied to peak detection circuitry via suitable automatic gain control (AGC) circuitry 10. The servo signal comprises the dipulse signals recorded on the position information data tracks of a magnetic disk, for example. The gain controlled dipulse signal from AGC circuit 10 is supplied both to a positive peak detector 11 and to a negative peak detector 12 via low pass filter circuitry 13. The output of the low pass filter is also applied to appropriate clock circuitry 14 which generates a clocking signal for activating either the positive peak detector 11 or the negative peak detector 12. Each peak detector, when activated, measures the peak amplitudes (positive or negative) of each of the dipulse signals and in each case provides an output signal the level of which is indicative of the last-occurring, peak amplitude.

The signals from peak detectors 11 and 12 are combined by appropriate summing circuitry 15 and the resulting signal is thereafter amplified by amplifier 16 to provide the desired position error signal, as shown, for supply to the servo system to move the transducer head in the desired direction in response thereto so as to cause the head to be accurately positioned between the reference position information tracks of the disk, as explained in the aforesaid patent.

The outputs of the peak detectors are also supplied to a differential amplifier 17, one of the inputs thereto representing the positive detector output and the other representing the sum of the output of the negative peak detector and an appropriate reference signal $V_{ref}$ obtained at summing circuit 18. The output of differential amplifier 17 is thereupon supplied to the automatic gain control amplifier 10.

As described in the Braun and Dunn patent, the positioning system drives the transducer to a position which is midway between two adjacent position information tracks, i.e., an "on-center" position therebetween, one of such tracks providing a positive dipulse signal and the other providing a negative dipulse signal. The servo system drives the transducer to a position such that the peak detected outputs of the positive and negative dipulses are substantially equal which causes the position error signal to be driven to zero when the transducer is at its desired "on-center" position.

In such a system not only do offset errors arise prior to the peak detection process but also the peak detectors themselves introduce additional offset errors all of which are present in the position error signal and all of which must be appropriately taken into account by suitable potentiometer adjustment circuitry. The potential offset errors due to peak detection tend to be reduced if, during the manufacture of the system, the components thereof, particularly the key resistor elements utilized in the peak detector circuitry, are hand selected to provide a minimization of offset errors.

Figure 2:
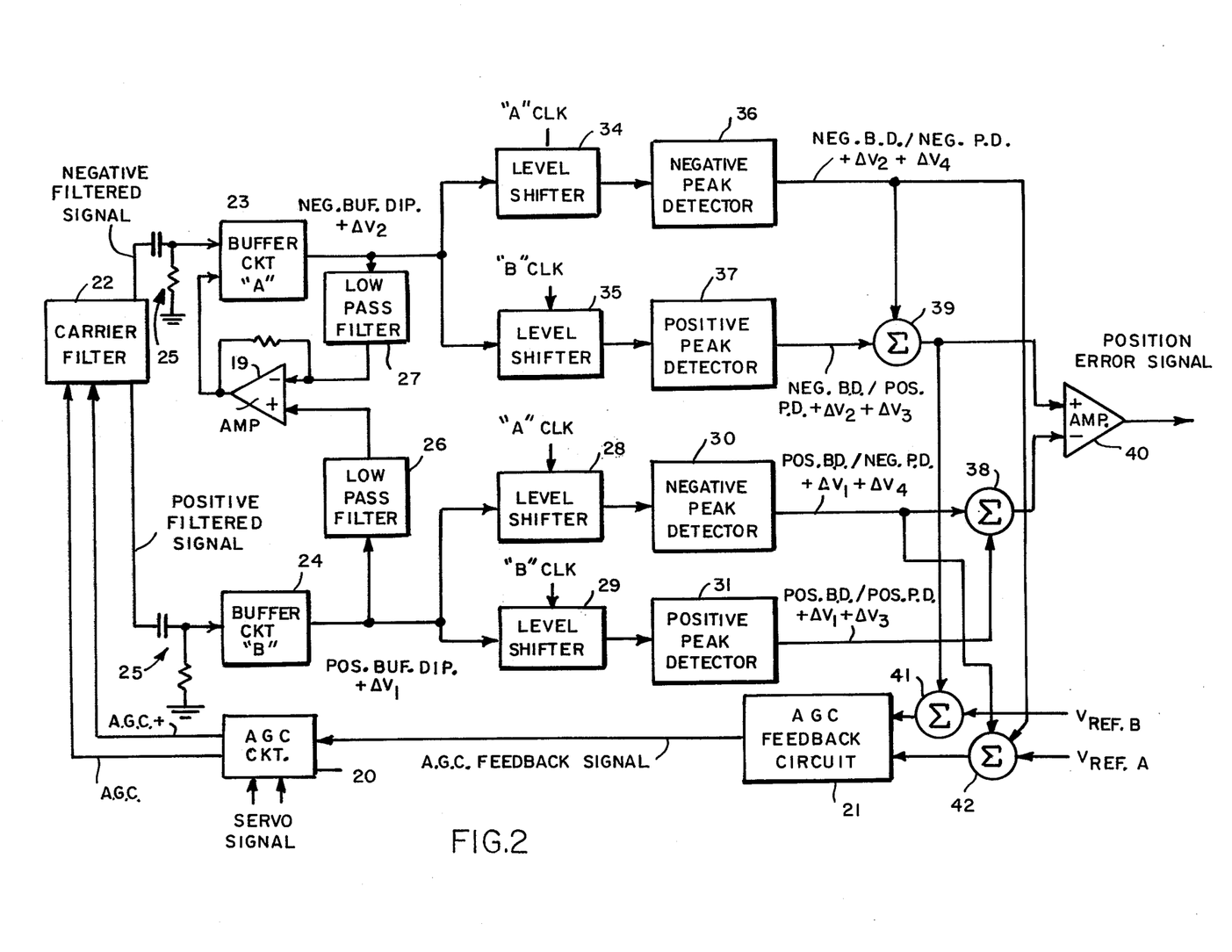
FIG. 2 shows a block diagram of a preferred embodiment of the system of the invention.

In order to overcome the necessity for potentiometer adjustments which cannot often be readily or conveniently made when the system is in use in the field and in order to avoid the necessary hand selection of resistor or other component values, the system of the invention can be utilized. As can be seen in FIG. 2, the system utilizes automatic gain control circuitry 20, as in the above discussed prior art system which circuitry is supplied with the servo signal and with a feedback signal from an AGC feedback circuit 21. As discussed in more detail below, the AGC circuit utilizes a double integration technique for providing more accurate positioning. The output of automatic gain control circuitry 20 is supplied to appropriate carrier filter circuitry 22 the outputs of which are thereupon supplied to Buffer "A" and Buffer "B" circuits 23 and 24, respectively, via R-C filter circuits 25.

Figure 3:
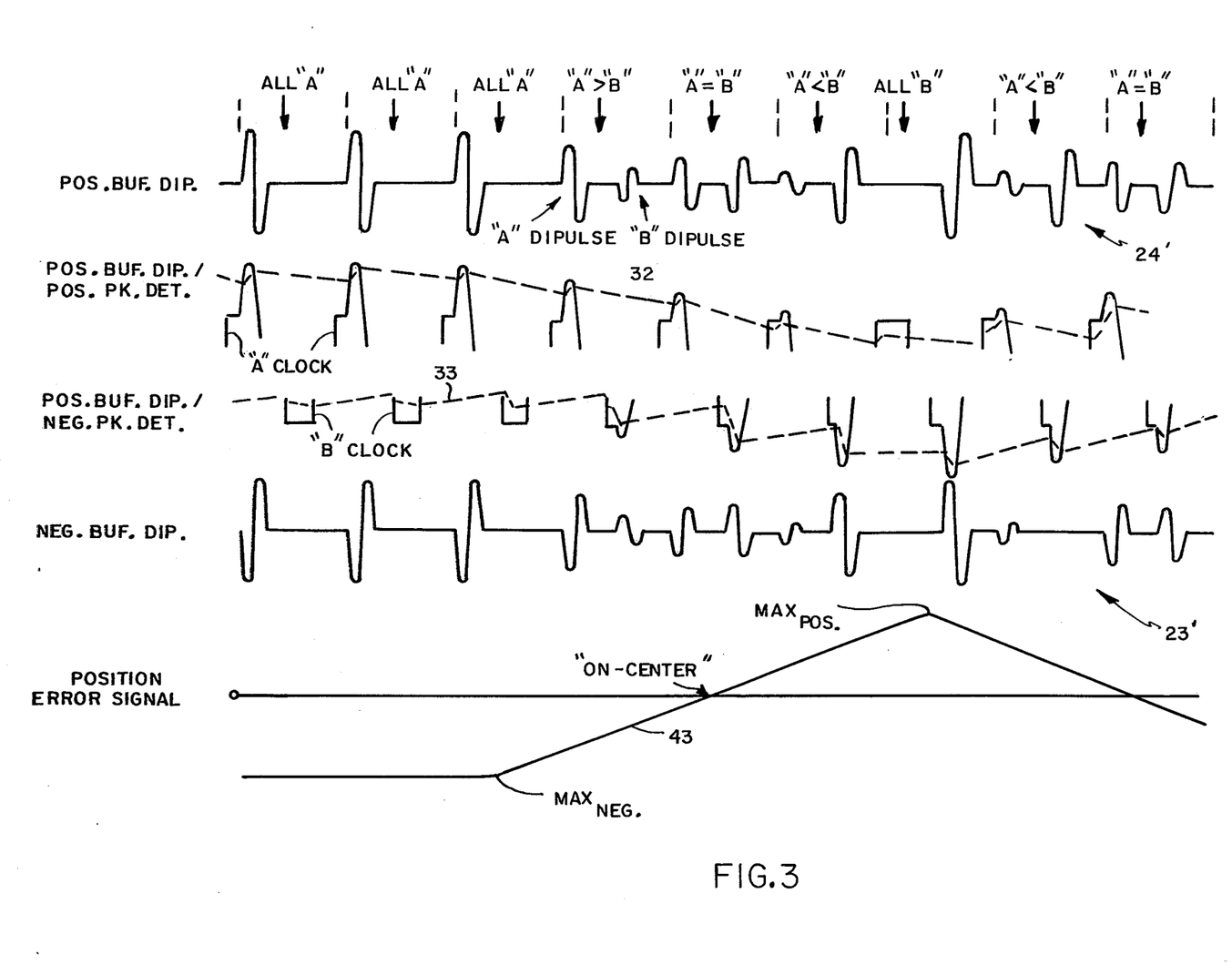
FIG. 3 shows a plurality of signal waveforms depicting the signals at various points in the block diagram of FIG. 2.

The positive buffer dipulse signal at the output of buffer circuit 24 is identified in FIG. 2 as the "POS BUF DIP" signal and may contain an offset error signal identified therein as "$\Delta V_1$". An example of a typical such signal is shown by waveform 24' in FIG. 3. The negative buffer dipulse signal from buffer circuit 23 is identified as the "NEG BUF DIP" signal in FIG. 2 and also may contain an offset error signal identified therein as "$\Delta V_2$". An example of a typical such signal is also shown in FIG. 3 by waveform 23' and, as can be seen, is the complement of the POS BUF DIP signal, i.e., the inverse or out-of-phase representation of the POS BUF DIP signal. The POS BUD DIP and the NEG BUF DIP signals are supplied to a differential amplifier 19 via suitable low pass filter circuits 26 and 27, respectively, the output of the amplifier being fed back to the input of one of the buffer circuits. In the particular embodiment shown in FIG. 2, the feedback signal is supplied to buffer circuit 23. The use of such feedback circuitry assures that any offset error signals which may be present, i.e., $\Delta V_1$ and $\Delta V_2$, are maintained substantially equal to each other.

In order to explain the operation of the level shifter circuits 28, 29, 34, 35 and peak detector circuits 30, 31, 36, 37 of FIG. 2, it is helpful to consider the additional waveforms shown in FIG. 3 which represent signals at various points in the POS BUF DIP signal channel comprising level shifters 28 and 29 and peak detectors 30 and 31. Similar signals occur in the NEG BUF DIP signal channel, although phase inverted with reference to the POS BUF DIP channel signals shown in FIG. 3. For convenience and clarity, only the operations on the signals in the POS BUF DIP signal channel will be described in detail, it being clear that similar operations take place in the NEG BUF DIP signal channel.

For convenience the dipulse signal from one data track will be defined as an "A" dipulse while that from the adjacent data track will be defined as a "B" dipulse, as seen in FIG. 3. The POS BUF DIP signal will contain, for each cycle, either all "A" dipulses when the transducer head is substantially over only the "A" data track, all "B" dipulses when the transducer head is essentially over only the "B" data track, or both "A" dipulses and "B" dipulses when the transducer head is partially over each data track. Thus, with respect to the exemplary POS BUF DIP signal of FIG. 3, during the first three cycles depicted therein, the transducer head is substantially only positioned over the "A" data track and, therefore, the signal contains only "A" dipulses. During the next three cycles the transducer head is positioned partially over each data track so that both an "A" dipulse and a "B" dipulse are present, the amplitudes thereof depending on where the transducer head is positioned relative to each track. Thus, when most of the transducer head is over the "A" track the "A" dipulse amplitude will be greater than that of the "B" dipulse ("A" > "B"). When the transducer is exactly "on-center" both dipulses are substantially equal ("A" = "B").

When the transducer head is mostly positioned over the "B" data track, the "B" dipulse is greater than the "A" dipulse ("A" < "B").

The next cycle depicted in FIG. 3 shows only a "B" dipulse indicating the transducer head is positioned substantially only over the "B" data track. In the last two cycles depicted the transducer head has again moved toward its on-center position and the signal contains both "A" and "B" dipulses.

The POS BUF DIP signal 24' is supplied to the pair of level shifter circuits 28 and 29 and the level shifted signals therefrom are appropriately supplied to negative peak detector 30 and positive peak detector 31, respectively. The output of the negative peak detector 30 is identified in FIG. 3 as the POS BUF DIP/NEG PK DET signal (abbreviated in FIG. 2 as the "POS BD/NEG PD" signal), while the output of the positive peak detector 31 is identified as the POS BUF DIP/POS PK DET signal (abbreviated as "POS BD/POS PD" signal).

The level shifters are clocked in such a way that only the positive peaks of the "A" dipulses are detected by peak detector 31 when the "A" dipulses are present, but at all other times is shifted so that no other positive peaks can be detected by the peak detector 31. In the same way the level shifters are clocked to shift the level of the POS BUF DIP signal so to permit only the negative pulses of the "B" dipulse to be peak detected by negative peak detector 30, all other negative pulses being shifted to a level which prevents such detection.

Accordingly, the positive and negative peak detector signals depicted by dashed lines 32 and 33, respectively, are present at the outputs thereof, as shown in FIG. 3. Such signals also include the original offset errors $\Delta V_1$ present at the output of buffer circuit 24 together with any other offset error signal which may arise because of the peak detection process, the latter being identified in FIG. 2 as $\Delta V_3$ from the positive peak detector 31 and as $\Delta V_4$ from the negative peak detector.

Similar processing occurs with respect to the NEG BUF DIP signal through level shifter circuits 34 and 35 and negative peak detector 36 and positive peak detector 37, respectively, to provide the peak amplitudes of the negative going pulse of the complementary "A" dipulses of the NEG BUF DIP signal and the peak amplitudes of the positive going pulse of the complementary "B" dipulses of the NEG BUF DIP signal. The outputs of the peak detectors provide corresponding NEG BUF DIP/NEG PK DET and NEG BUF DIP/POS PK DET signals as shown by the abbreviations thereof in FIG. 2. Such signals include any offset error signal $\Delta V_2$ present at the output of buffer circuit 23, as well as any additional offset error signals $\Delta V_3$ and $\Delta V_4$ arising in the negative peak detector and positive peak detector operations. In accordance with the invention the transistors in the negative peak detectors 30 and 36 and those in the positive peak detectors 31 and 37 are matched, respectively, so that the offset errors due to each of the corresponding peak detection processes are substantially the same in each channel. The peak detected signals in each channel are appropriately combined in summing circuits 38 and 39, the combined signals being thereupon supplied to a differential amplifier 40 so supply the position error signal.

Since the offset signals at corresponding peak detector outputs in each channel are substantially equal, such offset error signals are effectively cancelled at the differential amplifier 40 so that the output position error signal is substantially free of any offset errors. The combined peak detection signals are further combined with appropriate AGC reference signals, as shown in FIG. 2 at summing circuits 41 and 42, for supply to the AGC feedback circuit 21 to produce the AGC feedback signal to AGC circuit 20 in substantially the same manner as that disclosed in the previously issued Braun and Dunn patent. In this case the outputs from the negative peak detectors of each channel are combined with a suitable reference signal $V_{REF A'}$ while the outputs of the positive peak detectors of each channel are combined with a suitable reference signal $V_{REF B}$.

As shown by waveform 43 of FIG. 3, the position error signal is at a maximum when the transducer head is over only a single data track and is essentially zero when the head is "on-center" as desired.

Figure 4:
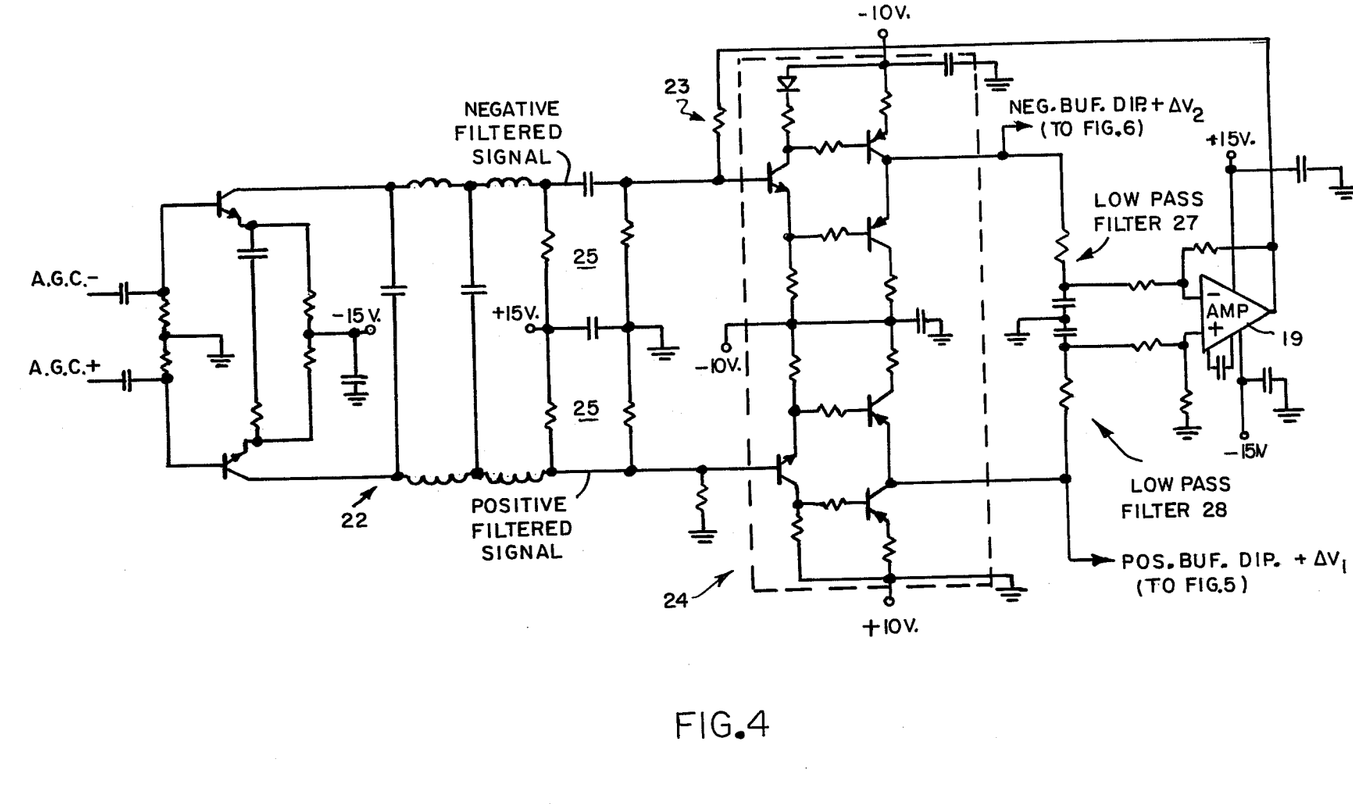
FIGS. 4–8 show specific circuit diagrams representing preferred embodiments of portions of the system shown by the block diagram of FIG. 2.

Implementation of the block diagram of FIG. 2 by appropriate specific circuitry is shown and discussed with reference to FIGS. 4–8. As can be seen in FIG. 4, the AGC signals representing the positive filtered signal and the complementary, or negative, filtered signal, that is, the automatic gain controlled representations of the signals from the transducer head (identified as AGC+ and AGC−) containing the raw data from adjacent position information tracks, both in positive form and in phase-inversed negative form, are supplied through appropriate AGC circuitry 20 to carrier filter circuit 22 comprising, for example, a pair of well-known Butterworth filters. The filtered output signals are further supplied to R-C circuits 25 and, thence, to buffer circuits 23 and 24, respectively, the outputs of which are identified as the NEG BUF DIP + $\Delta V_2$ and the POS BUF DIP + $\Delta V_1$ signals in FIG. 4. Such signals are supplied through low pass filters 27 and 28, respectively, to feedback amplifier 19 the output of which is supplied to the input of buffer circuit 23, as shown. The use of such feedback circuitry tends to assure that any offset errors $\Delta V_1$ and $\Delta V_2$ present in the incoming signals to buffer circuits 24 and 23, respectively, are maintained substantially equal to each other.

Figure 5:
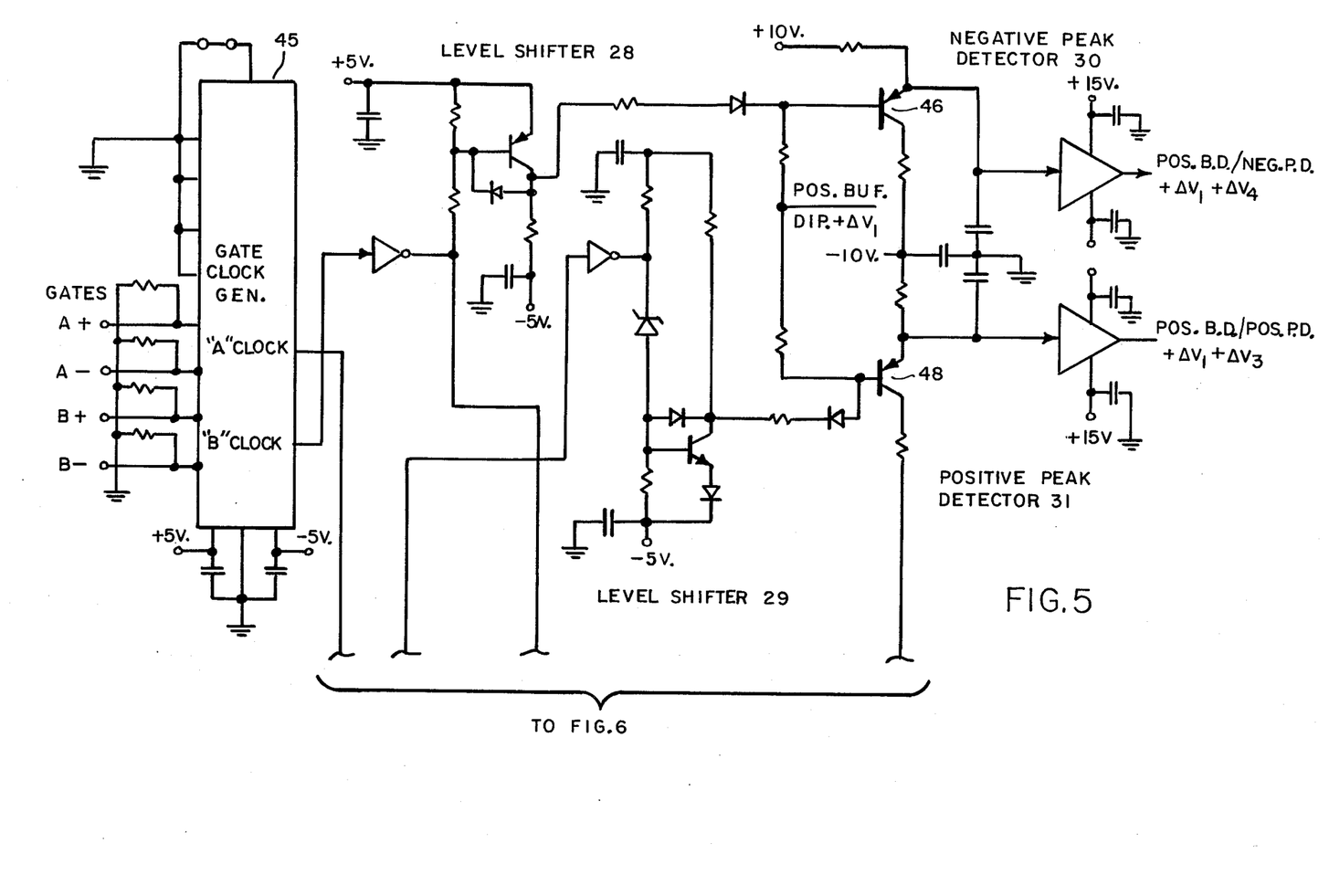
Figure 6:
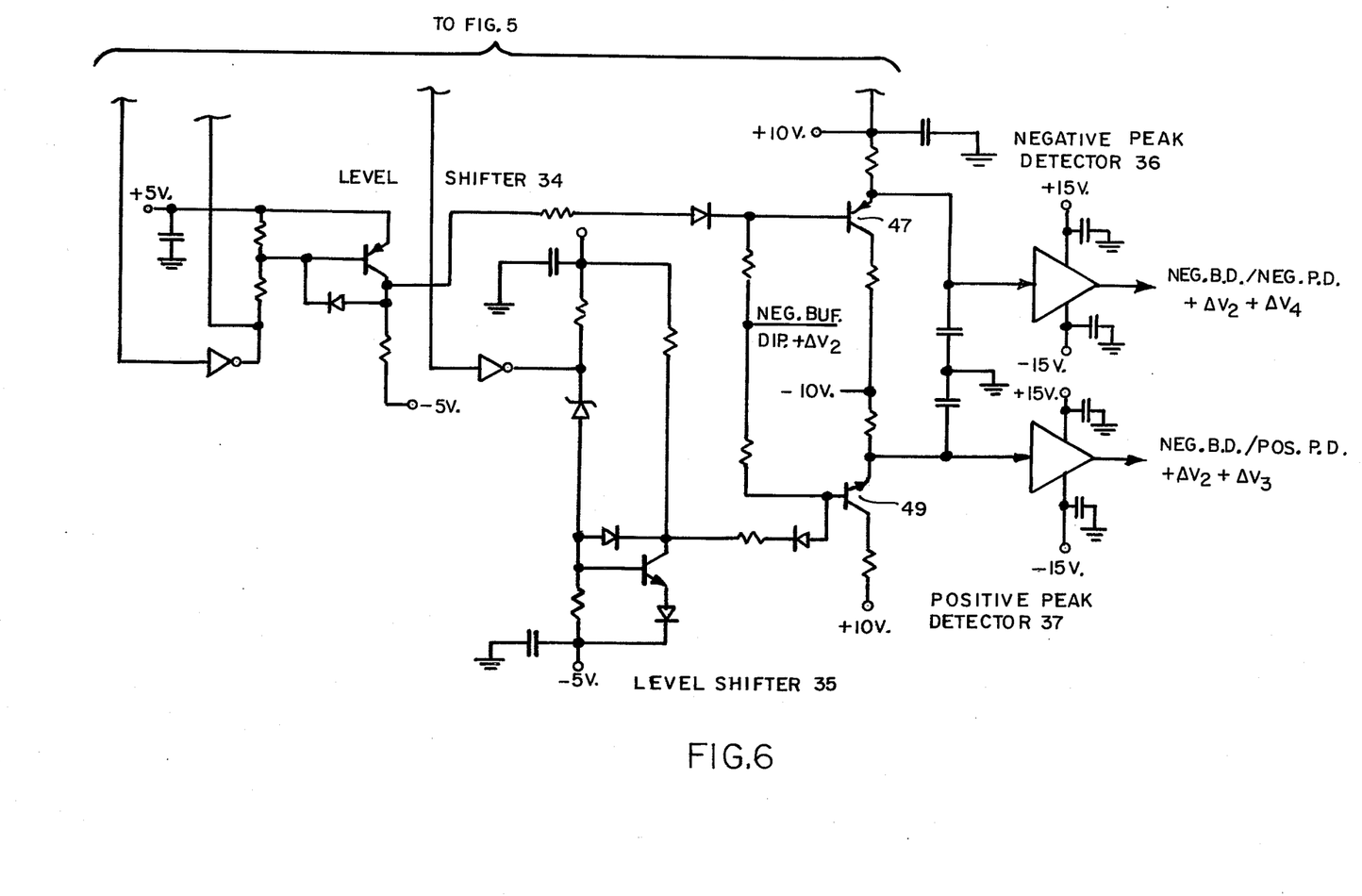

FIGS. 5 and 6 show the POS BUF DIP and NEG BUF DIP signal channels, respectively of FIG. 2. As can be seen in FIG. 5, level shifters 28 and 29 are supplied with the appropriate clock signals from a gate clock generator 45. So long as a clock signal is not present, the level shifters cause the level of the input signals thereto to be shifted to a level out of the operating peak level of the peak detectors which are supplied therefrom so that the peak amplitudes of the shifted signals cannot be detected thereby. When a clock signal is present, as seen, for example, in the waveforms of FIG. 3, the input to a level shifter is no longer shifted out of the corresponding peak detector range and is supplied directly to the appropriate peak detector so that the desired peak amplitudes are then appropriately detected. As can be seen in FIG. 3, with the reference to the POS BUF DIP signal which is supplied to the positive peak detector 31 of FIG. 5, the signal (shown by waveform 32) is shifted at all times except when the "A" clock pulse is present, the latter being present only during the positive half of an "A" dipulse. At those points in time, the peak amplitude of the positive half of the "A" dipulse is appropriately detected by positive peak detector 31 to form the peak detected signal 32 identified in FIG. 5 as the POS BD/POS PD signal.

The "B" clock pulses are supplied to level shifter 28 so as to cause the negative peak detector to detect only the peak amplitudes of the negative portion of the "B" dipulses in the POS BUF DIP signal, as seen by waveform 33 in FIG. 3. At all other times the signal is sufficiently shifted in level to prevent any detection by negative peak detector circuit 30. Accordingly, the negative peak detector 31 provides a signal which represents the peak amplitudes of the negative portion of the "B"

dipulses, as identified in FIG. 5 by the POS BD/NEG PD signal.

A similar process takes place with reference to the NEG BUF DIP channel depicted in FIG. 6 which supplies both the NEG BD/NEG PD and NEG BD/POS BD signals.

In each case the signals from the POS BUF DIP channel and the NEG BUF DIP channel include whatever offset errors may be present prior to the peak detection process (i.e., $\Delta V_1$ and $\Delta V_2$) as well as any offset errors which may be generated during the peak detection processes. In order to assure that the peak detector offset errors generated in each channel are substantially the same with respect to corresponding peak detection circuits, the transistor 46 of the negative peak detector 30 of FIG. 5 is matched to the transistor 47 in the negative peak detector 36 of FIG. 6 so that any offset error components $\Delta V_4$ arising in each case are substantially the same. Further, the transistor 48 of positive peak detector 31 in FIG. 5 is matched to transistor 49 of the positive peak detector 37 in FIG. 6 so that any offset error components $\Delta V_3$ arising in each case are also substantially the same. The matching of such transistors not only provides for elimination of offset errors but also assures that the circuitry maintains good temperature stability during operation.

Figure 7:
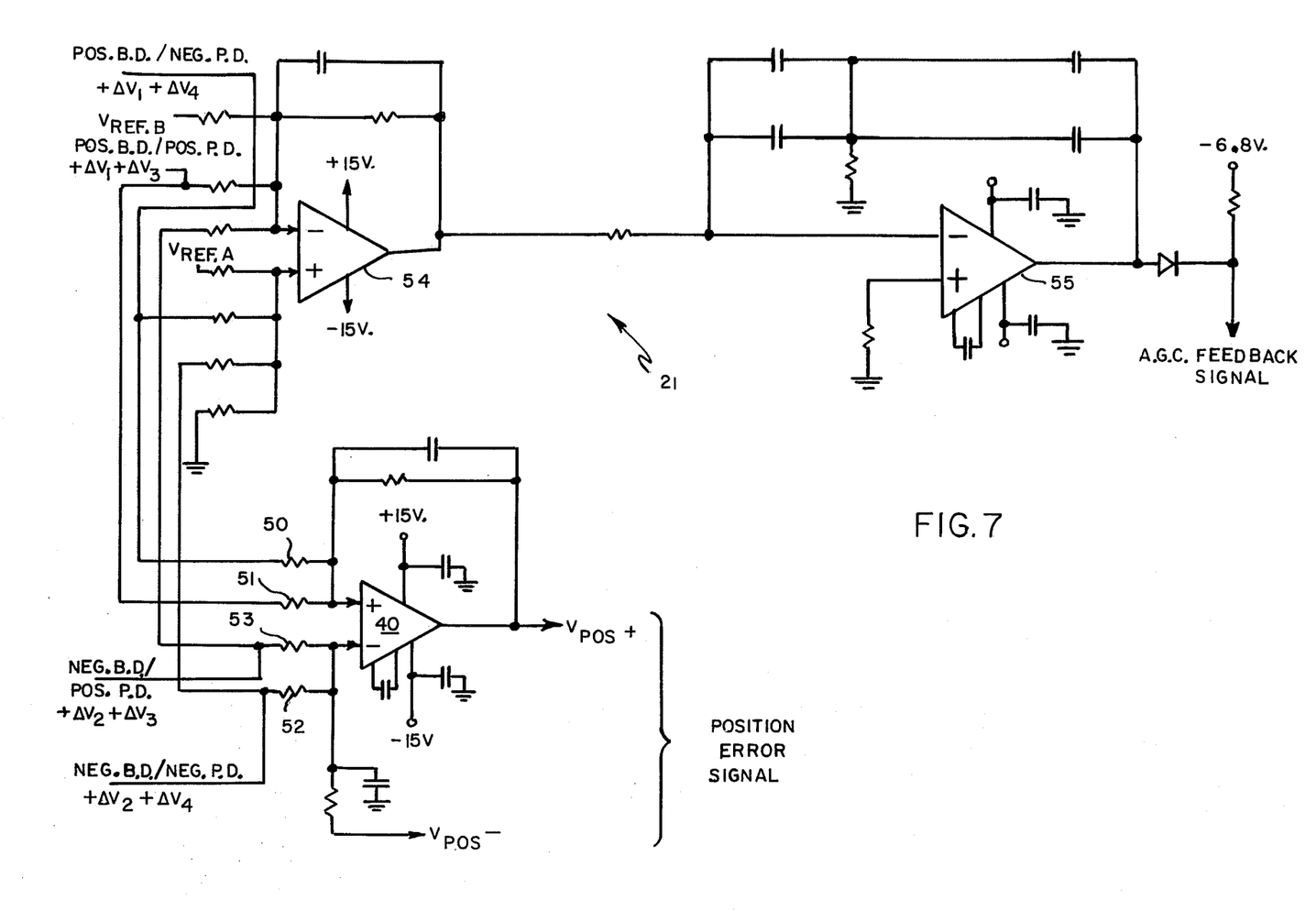

As can be seen in FIG. 7, the peak detected signals from the POS BUF DIP channel (from FIG. 5) are combined at summing resistors 50 and 51 and thereupon supplied to the positive input of differential amplifier 40. The peak detected signals from the NEG BUF DIP channel (from FIG. 6) are also summed at resistors 52 and 53, the combined signal thereby being supplied to the negative input of differential amplifier 40. The position error signal supplied from amplifier 40 has two components, the positive position error component $V_{POS+}$ taken from the output of differential amplifier 40 and a negative position error component $V_{POS-}$ which latter signal is, in effect, the combined outputs of the NEG BUF DIP channel. Such position error signal is supplied to the servo system in accordance with conventional practice as discussed in the above-referenced, previously-issued Braun and Dunn patent.

The remainder of the circuitry in FIG. 7 depicts the AGC feedback circuit 21 wherein the POS BD/POS PD signal and the NEG BD/POS PD signal are combined with reference signal $V_{REF\,B}$ through appropriate summing resistors and supplied to the negative input of amplifier 54, while the POS BD/NEG PD signal and the NEG BD/NEG PD signal are combined with reference signal $V_{REF\,A}$ through appropriate summing resistors and supplied to the positive input of amplifier 54. The output of the latter amplifier is supplied to a further amplifier 55 to provide the AGC feedback signal, as depicted in FIG. 2. As can be seen therein the capacitance feedback circuitry associated with amplifier 55 provides a double-integration operation and, hence, a higher loop gain at the frequencies of operation involved so as to produce improved accuracy in positioning.

Figure 8:
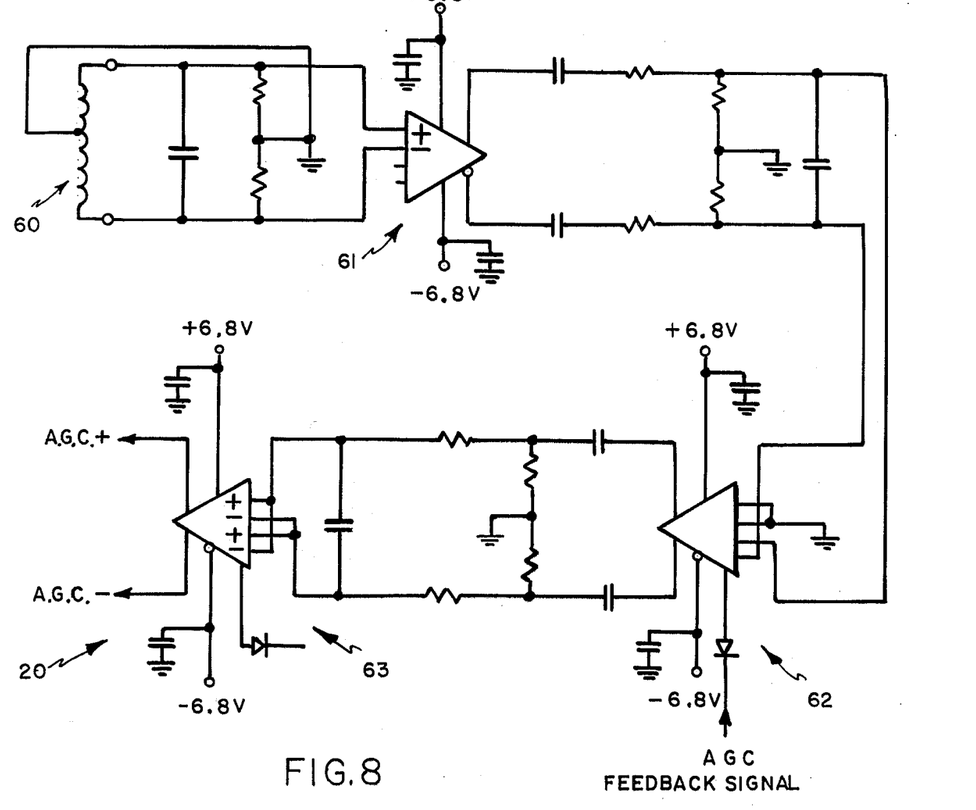

The AGC circuit 20 of FIG. 2 as supplied from the servo signal from the read/write transducer head is depicted in FIG. 8, the transducer head being schematically shown therein by center-tapped coil 60. The complementary output signals therefrom are supplied to preamplifier circuitry 61 in a conventional manner and thereupon through appropriate filter circuitry to an AGC amplifier circuit 62 and, thence, to a phase switching circuit 63 for supplying the AGC+ and AGC− signals as shown. Such circuitry is substantially conventional in devices of the type in which the invention is utilized and the structure and operation as depicted in FIG. 8 is well known to those in the art, being depicted herein to show with completeness the overall circuitry associated with the invention. The position servo system to which the position error signal is supplied and from which the servo signal is obtained does not form a specific part of the invention and is not depicted in detail since it would be well known to those in the art.

Specific modifications of the circuit details which are shown in the preferred embodiments of the invention depicted herein may occur to those in the art without departing from the nature and scope of the invention. Hence, the invention is not to be construed as limited to the specific embodiment discussed herein except as defined by the amended claims.

What is claimed is:

1. In a transducer positioning system wherein a transducer is positioned over a magnetic media by sensing position information, the sensed position information consisting of a first plurality of dipulse groups, each group comprising a first dipulse having a first pulse of a first polarity and a second pulse of a second polarity and a second dipulse having a first pulse of the second polarity and a second pulse of the first polarity, and a second plurality of dipulse groups, each group comprising dipulses which are complementary to the first and second dipulses of said first plurality of dipulse groups, a system for detecting certain peak amplitudes within said first and second plurality of dipulse groups comprising buffer means responsive to said first and second plurality of dipulse groups for providing first and second buffered signals comprising said first and second plurality of dipulse groups, respectively, and first and second offset error signals present therein, respectively, said buffer means including means for making said first and second offset error signals substantially equal;

first peak detection means responsive to said first buffered signal for detecting the peak amplitudes of said first polarity pulses of each of said first dipulses and for detecting the peak amplitudes of said second polarity pulses of each of said second dipulses to provide first and second peak amplitude signals which include said first offset error signal and third and fourth offset error signals, respectively, arising in said first peak detection means;

second peak detection means responsive to said second buffered signal for detecting the peak amplitudes of the polarity pulses which are complementary to said first polarity pulses and for detecting the peak amplitudes of the polarity pulses which are complementary to said second polarity pulses to provide third and fourth peak amplitude signals which include said second offset error signal and fifth and sixth offset error signals, respectively, arising in said second peak detection means;

the peak detection responses of said first and said second peak detection means being matched to produce substantially equal third and sixth offset error signals and substantially equal fourth and fifth offset error signals;

means for combining said first, second, third and fourth peak amplitude signals for producing an output signal in which said offset error signals are minimized.

2. A system in accordance with claim 1 wherein said buffer means includes
   first buffer means responsive to said first plurality of dipulse groups for providing said first buffered signal;
   second buffer means responsive to said second plurality of dipulse groups for providing said second buffered signal;
   feedback means responsive to said first and second buffered signals for supplying a feedback signal to the input of one of said first and second buffer means to make said first and second offset error signals substantially equal.

3. A system in accordance with claim 2 wherein said feedback means includes differential amplifier means responsive to said first and second buffered signals for supplying a differentially amplified feedback signal to the input of said first buffer means.

4. A system in accordance with claim 3 wherein said feedback means further includes first and second low pass filter means for filtering said first and second buffered signals, respectively, said differential amplifier means being responsive to said first and second filtered buffer signals.

5. A system in accordance with claim 1 wherein said first polarity pulses have a positive polarity and said second polarity pulses have a negative polarity, and further wherein
   said first peak detection means comprises
      a positive peak detector circuit for detecting the peak amplitudes of the positive polarity pulses of each of said first dipulses to produce said first peak amplitude signal; and
      a negative peak detector circuit for detecting the peak amplitudes of the negative polarity pulses of each of said second dipulses to produce said second peak amplitude signal; and
   said second peak detection means comprises
      a negative peak detector circuit for detecting the peak amplitudes of the negative polarity pulses of each of said complementary first dipulses to produce said third peak amplitude signal; and
      a positive peak detector circuit for detecting the peak amplitudes of the positive polarity pulses of each of said complementary second dipulese to produce said fourth peak amplitude signal.

6. A system in accordance with claim 5 wherein the detection element of each of said first, second, third and fourth peak detector circuits comprises a transistor element, the transistor elements of said positive peak detector circuits of said first and second peak detection means being selected to have matched operating characteristics and the transistor elements of said negative peak detector circuits of said first and second peak detection means being selected to have matched operating characteristics.

7. A system in accordance with claim 6 and further including
   level shifting circuit means associated with each of said peak detector circuits to control the levels of the buffered signals supplied thereto so that said levels are within the operating ranges of said peak detector circuits when the polarity pulses whose peak amplitudes are detected thereby are present and are outside said operating ranges at all other times.

8. A system in accordance with claim 7 and further including
   clock means for providing clocking control signals for controlling the operation of said level shifting circuit means.

9. A system in accordance with claim 1 and further including automatic gain control (AGC) feedback circuitry responsive to said peak amplitude signals for producing an AGC feedback signal for said system, and AGC feedback circuitry including means for providing a double integration of said peak amplitude signals in producing said AGC feedback signal.

* * * * *